United States Patent
Lenk et al.

(10) Patent No.: US 6,178,493 B1
(45) Date of Patent: Jan. 23, 2001

(54) MULTIPROCESSOR STALLED STORE DETECTION

(75) Inventors: Peter Steven Lenk; Michael J. Mayfield; Robert James Reese; Michael Thomas Vaden, all of Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/026,088

(22) Filed: Feb. 19, 1998

(51) Int. Cl.[7] .................................................. G06F 15/00
(52) U.S. Cl. ................................ 712/28; 712/29; 712/204
(58) Field of Search ................... 712/28, 23, 29, 712/204, 210, 218

(56) References Cited

U.S. PATENT DOCUMENTS

| | | | |
|---|---|---|---|
| 4,591,975 | * 5/1986 | Wade et al. ........................... | 710/260 |
| 5,710,912 | * 1/1998 | Schlansker et al. .................. | 712/220 |
| 5,848,276 | * 12/1998 | King et al. ........................... | 710/200 |
| 5,909,561 | * 6/1999 | Arimilli et al. ...................... | 711/118 |

* cited by examiner

Primary Examiner—Meng-Ai T. An
Assistant Examiner—Mackly Monestime
(74) Attorney, Agent, or Firm—Kelly K. Kordzik; Winstead Sechrest & Minick P.C.; Anthony V. S. England

(57) ABSTRACT

In a multiprocessor system, when a store request has stalled, a signal is generated and sent to all processors indicating such a stalled store situation. In response, all processors will postpone the sending of load, or read, requests to memory until the stalled store request has completed.

17 Claims, 2 Drawing Sheets

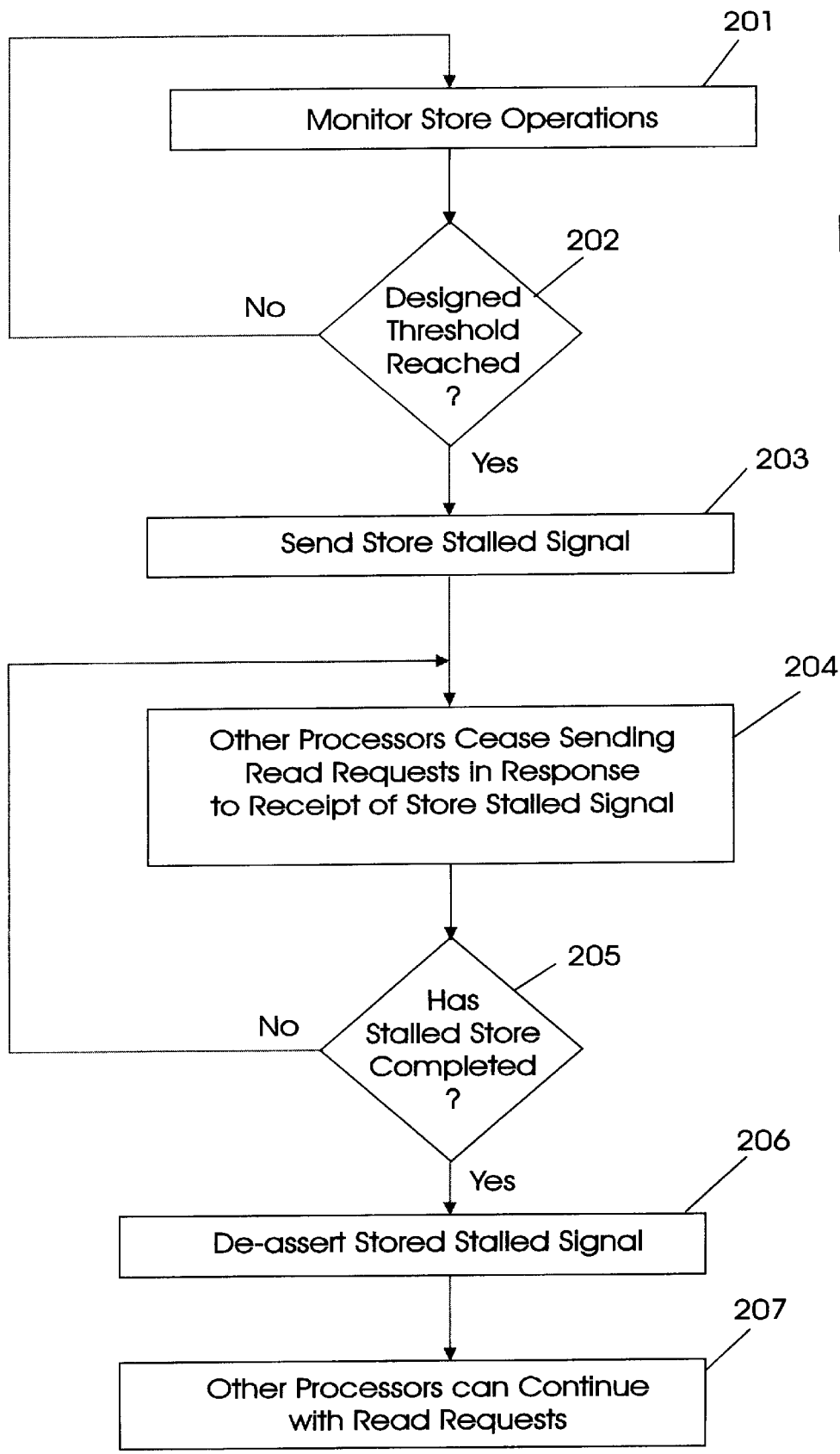

MULTIPROCESSOR STALLED STORE DETECTION

TECHNICAL FIELD

The present invention relates in general to data processing systems, and in particular, to store and load operations within a multiprocessor system.

BACKGROUND INFORMATION

In multiprocessor systems, situations arise in which the instruction stream executing on one or more processors depends on the successful completion of a memory store operation issued by another processor. Under some circumstances, the store is unable to successfully place its data into memory because the operations initiated by other system participants totally consume the available interconnection bandwidth or have the equivalent effect of blocking the store due to side effects of hazard detection hardware. This store "starvation" may result in a failure to make forward progress in the program which ultimately causes the program to fail. An example of this can be seen in the following pseudo-code:

| | P1: | | P2: |
|---|---|---|---|
| loop: | load word | Rx, A | store word Rz, A |
| | load word | Ry, B | |
| | compare word immediate | A, value | |
| | branch if not equal | loop | |

Two processors P1, P2 are involved in a spin loop in which one is waiting for a specific value to be stored by the other processor. Rx, Ry, and Rz refer to processor registers, and A and B are memory addresses. The "compare word immediate" uses a literal value, but comparison to any other source (such as the contents of another register) could also be used.

The store word to A executing in processor P2 updates a location with a value which is required by the code executing on processor P1 to make forward process. The loop continues until the expected value is obtained. The second load word instruction (from location B) executing in processor P1 is not strictly needed to create the starvation scenario if location A is not placed into processor P1's cache memory. It is shown in this example to describe a more common situation where locations A and B are cacheable. If processor P1's cache is direct mapped and the addresses of locations A and B cause them to occupy the same slot in that cache, the instruction loading word A and the instruction loading word B would always miss, therefore creating repetitive reads from memory external to the processor. If one assumes a more associative cache in processor P1, more load word instructions requiring the same slot can be added to the code sequence. The resulting read traffic can have the potential effect of blocking the completion of processor P2's store word to A. The likelihood of this blockage increases in a system with a large number of processors if many of the processors are waiting for the value, each executing the sequence shown for processor P1.

As a result, there is a need in the art for a solution that permits a stalled store operation to progress.

SUMMARY OF THE INVENTION

The present invention addresses the foregoing problem by providing hardware and a state machine that monitors store requests within each processor in a multiprocessing system and then asserts a store stalled signal in response to a defined threshold being met. This threshold may be the counting of failed store transactions within any one processor, failed arbitrations associated with a stall store operation, or even clock cycles. The store stalled signal is transmitted to all of the processors within the system. In response, read (load) requests pending within those processors are postponed until the stalled store request is allowed to complete. The store stalled signal is then de-asserted and the other processors then continue with their read requests.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a process for implementing the present invention.

DETAILED DESCRIPTION

Figure 1:
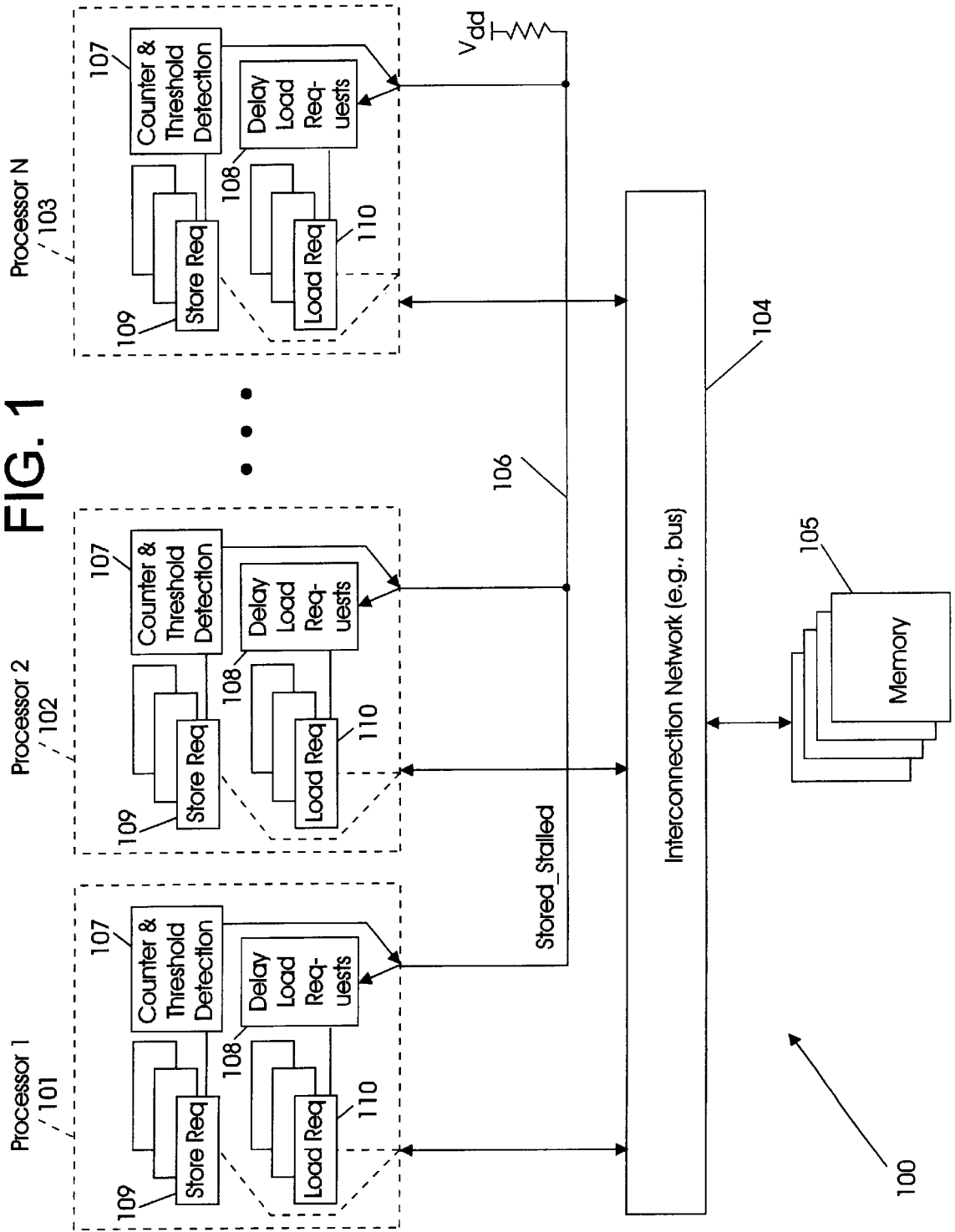
FIG. 1 illustrates a multiprocessing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated multiprocessing system 100, including N processors 101–103 coupled to interconnection network (bus) 104 and memory system 105. However, it should be noted that the present invention is applicable to any system by which multiple components send store and read requests to another component, such as a memory system or I/O device.

Each processor 101–103 can send a plurality of store requests (REQ) 109 and load requests (REQ) 110 through bus 104 to memory 105. Counter and threshold detection circuitry 107 within each processor 101–103 monitors the store requests 109. It is the function of circuitry 107 to detect the repeated failure of store operations. This may be determined in any manner, including a counting of the number of times a particular store request fails, a counting of the number of times a particular store request is unable to successfully arbitrate for control of bus 104, or even a counting of the number of clock cycles passing after a store request has been issued without successfully completing.

Store requests 109 are considered to have not completed when they have been sent on the interconnection network (bus) 104 and rejected by any bus participants using the communication protocol for that bus, including processors 101–103, memory 105, or surrogates. Means by which such attempts can be counted are well-known to those both skilled in the art and familiar with the details of a particular bus protocol being implemented. Once the designed threshold has been reached, a Store_Stalled signal 106 is asserted and sent to all of processors 101–103 indicating that a store has stalled in its attempts to write memory and therefore needs a greater opportunity to use bus 104 to memory 105. All processors 101–103 (including the one with stalled stores) monitor this signal 106 and, when asserted, will cease placing read requests 110 onto their path to bus 104. This is performed by delay load request circuitry 108. Load (memory read) requests 110 are generally sent to the bus 104 for system-level arbitration. In processors which support multiple outstanding read requests 110, such requests can be arbitrated internally with the one selected then sent to the bus 104 for further system-level arbitration. By gating off such requests when a Store_Stalled signal 106 is seen asserted, the read requests 110 can be prevented from being placed on the bus. If earlier read requests 110 have already been placed on the bus 104, they may be permitted to complete or may be aborted, depending on the details of the chosen implementation.

The Store_Stalled signal may be a common bi-directional signal, which is asserted low by a processor after a number of failed attempts, or some other designed threshold as described above. It may have an open-drain drive, which is resistively pulled up. Depending on the processor and system design, it may be sent asynchronously or may need to be synchronized with the processor clock.

Referring to FIG. 2, there is illustrated a flow diagram of the process of the present invention. In step 201, circuitry 107 monitors store request 109 within each processor 101–103. Within any one processor 101–103, if the designed threshold is reached in step 202, the process proceeds to step 203 whereby the Store_Stalled signal is asserted and sent to all processors 101–103. Thereafter, in step 204, delay load request circuitry 108 within each of processors 101–103 will cause processors 101–103 to cease (postpone) sending read requests 110 in response to receipt of this Store_Stalled signal. This will continue in step 205 until the stalled store operation has completed. Store requests 109 are considered completed when they have been sent on the interconnection network (bus) 104 without being rejected by any bus participants using the communication protocol for that bus, including processors 101–103, memory 105, or surrogates. Means by which such attempts can be counted are well-known to those skilled in the art. Upon successful completion of the store operation which had been stalled, the counter and threshold detection circuitry 107 in the processor with the stalled store is reprogrammed to an initial state, allowing it to watch for other stalled stores. Then, in step 206, the Store_Stalled signal is de-asserted. In response, in step 207, circuitry 108 within each of processors 101–103 will allow those processors to then continue with their load requests 110.

Although the present invention and its advantages have been described in detail, it should be understood that various changes, substitutions and alterations can be made herein without departing from the spirit and scope of the invention as defined by the appended claims.

What is claimed is:

1. A multiprocessor system comprising:
  a first processor;
  a second processor; and
  a bus coupling the first and second processors,
  wherein the first processor includes:
    circuitry for detecting a stalled store operation in the first processor; and
    circuitry for sending a store_stalled signal to the second processor,
  wherein the second processor includes:
    circuitry for postponing read operations from the second processor in response to receipt of the store_stalled signal from the first processor, wherein the first processor further includes circuitry for discontinuing to send the store_stalled signal to the second processor upon completion of the store operation.

2. The system as recited in claim 1, wherein the second processor further includes circuitry for discontinuing the postponing of the read operations in response to the discontinuing of the store_stalled signal.

3. The system as recited in claim 2, wherein the store and read operations are intended for a memory system coupled to the bus.

4. A multiprocessor system comprising:
  a first processor;
  a second processor; and
  a bus coupling the first and second processors,
  wherein the first processor includes:
    circuitry for detecting a stalled store operation in the first processor; and
    circuitry for sending a store_stalled signal to the second processor,
  wherein the second processor includes:
    circuitry for postponing read operations from the second processor in response to receipt of the store_stalled signal from the first processor, wherein the store_stalled signal is sent when a designated threshold associated with the detected stalled store operation is reached.

5. The system as recited in claim 4, wherein the sending circuitry further comprises a counter for counting a number of times the stalled store operation fails.

6. The system as recited in claim 5, wherein the sending circuitry further comprises a counter for counting a number of times the stalled store operation fails to successfully arbitrate control of the bus.

7. The system as recited in claim 4, wherein the sending circuitry further comprises a counter for counting a number of cycles after the stalled store operation is attempted.

8. A multiprocessor system comprising:
  a first processor;
  a second processor; and
  a bus coupling the first and second processors,
  wherein the first processor includes:
    circuitry for detecting a stalled store operation in the first processor; and
    circuitry for sending a store_stalled signal to the second processor,
  wherein the second processor includes:
    circuitry for postponing read operations from the second processor in response to receipt of the store_stalled signal from the first processor, wherein the first processor includes second circuitry for postponing read operations from the first processor in response to receipt of the store_stalled signal from the first processor.

9. In a multiprocessor system comprising a first processor, a second processor, and a bus coupling the first and second processors, a method comprising the steps of:

detecting a stalled store operation in the first processor;

sending a store_stalled signal to the second processor;

postponing read operations from the second processor in response to receipt of the store_stalled signal from the first processor; and discontinuing to send the store_stalled signal to the second processor upon completion of the store operation.

10. The method as recited in claim 9, further comprising the step of discontinuing the postponing of the read operations in response to the discontinuing of the store_stalled signal.

11. The method as recited in claim 10, wherein the store_stalled signal is sent when a designated threshold associated with the detected stalled store operation is reached.

12. The method as recited in claim 11, wherein the sending step further comprises the step of counting a number of times the stalled store operation fails.

13. The method as recited in claim 11, wherein the sending step further comprises the step of counting a number of times the stalled store operation fails to successfully arbitrate control of the bus.

14. The method as recited in claim 11, wherein the sending step further comprises the step of counting a number of cycles after the stalled store operation is attempted.

15. The method as recited in claim 11, wherein the store and read operations are intended for a memory system coupled to the bus.

16. In a multiprocessor system comprising a first processor, a second processor, and a bus coupling the first and second processors, a method comprising the steps of:

detecting a stalled store operation in the first processor;

sending a store_stalled signal to the second processor;

postponing read operations from the second processor in response to receipt of the store_stalled signal from the first processor; and postponing read operations from the first processor in response to receipt of the store_stalled signal from the first processor.

17. In a multiprocessor system comprising a first processor, a second processor, and a bus coupling the first and second processors, a method comprising the steps of:

detecting a stalled store operation in the first processor;

sending a store_stalled signal to the second processor; and postponing read operations from the second processor in response to receipt of the store_stalled signal from the first processor, wherein the store_stalled signal is sent when a designated threshold associated with the detected stalled store operation is reached.

* * * * *